United States Patent [19]

Bouix et al.

[11] Patent Number: 5,297,193
[45] Date of Patent: Mar. 22, 1994

[54] WIRELESS TELEPHONE NETWORK CENTRALIZED MAINTENANCE METHOD

[75] Inventors: Alain Bouix, Longjumeau; Claude Hilbert, Issy les Moulineaux, both of France

[73] Assignee: Alcatel N.V., Amsterdam, Netherlands

[21] Appl. No.: 706,970

[22] Filed: May 29, 1991

[30] Foreign Application Priority Data

May 30, 1990 [FR] France .................. 90 06706

[51] Int. Cl.$^5$ .................. H04M 11/00; H04M 3/10
[52] U.S. Cl. .................. 379/63; 379/32; 379/58
[58] Field of Search ............ 379/2, 26, 32, 63, 58–60, 379/112; 370/13, 60, 60.1, 110.1

[56] References Cited

U.S. PATENT DOCUMENTS

| | | | |
|---|---|---|---|
| 4,180,708 | 12/1979 | Yamaguchi et al. | 379/2 |
| 4,415,770 | 11/1983 | Kai et al. | 379/32 |
| 5,095,500 | 3/1992 | Tayloe et al. | 379/32 |

OTHER PUBLICATIONS

Ericsson Review article: "A Service Management System for the Intelligent Network", No. 1, 1990, pp. 32–41.
S. Hansen et al., "The GSM Base Station System . . . ", 8th European Conf. on Electrotechnics, Stockholm, Jun. 1989, pp. 470–473.
R. W. Henn et al., "AT&T Next Generation Digital . . . ", International Switching Sumposium, Stockholm, vol. 6, 1990, pp. 195–198.
M. M. Kaplan, "Design and Implementation of . . . ", International Switching Symposium, Phoenix, vol. 1, Mar. 1987, pp. 195–198.
M. Beyltjens, "Telecommunications Management Networks", Electrical Communication, Brussels, vol. 63, 1989, pp. 356–365.
Dunogue et al, "The Building of Intelligent Networks", *Commutation & Transmission n2 -1989*, pp. 5–22.

*Primary Examiner*—Jin F. Ng
*Assistant Examiner*—Dwayne D. Bost
*Attorney, Agent, or Firm*—Robbins, Berliner & Carson

[57] ABSTRACT

A wireless telephone network includes a distribution network having fixed stations and wireless digital telephones linked by radio to the fixed stations, an integrated services digital public switching telephone network to which each fixed station is connected by a user to user signaling channel, service control points connected to the public switching telephone network and each having a wireless telephone service subscriber database and a call processing device, and a service management system having a reference database. The network is maintained on a centralized basis by transmitting a maintenance message from a fixed station to a service control point over the user to user signaling channel in response to the fixed station detecting a fault, generating a maintenance ticket at the service control point, transmitting the maintenance ticket to the service control point, and storing the maintenance ticket in the database.

4 Claims, 2 Drawing Sheets

WIRELESS TELEPHONE NETWORK CENTRALIZED MAINTENANCE METHOD

BACKGROUND OF THE INVENTION

Field of the Invention

The invention concerns a centralized maintenance method for a wireless telephone network comprising: fixed stations; an integrated services digital public switched telephone network to which each fixed station is connected by telephone channels; and wireless mobile telephones linked by radio to the fixed stations. The invention is more particularly concerned with a wireless telephone service provided by an intelligent network to be described later.

Cross Reference to Related Applications

Other applications of some of the concepts underlying the present invention are disclosed in the commonly assigned U.S. patent application filed on Jul. 16, 1990 under Ser. No. 07/552,965, now U.S. Pat. No. 5,040,177 and the three applications filed concurrently herewith under Ser. Nos. 07/706,981, now abandoned, 07/706,765, now U.S. Pat. No. 5,297,189, and 07/706,969 continued as Ser. No. 08/002,100. To the extent such copending applications may contain any additional information that might be of any assistance in the use and understanding of the invention claimed herein, they are hereby incorporated by reference.

Description of the Prior Art

Fixed station maintenance involves transmitting an alarm message from a fixed station to a maintenance center whenever an incident occurs in the fixed station and requires the periodic execution in each fixed station of a self-test procedure and transmission of the results of said test to the maintenance center.

A known fixed station maintenance method involves memorizing in each fixed station the incidents and the self-test results and then transmitting them during periods when traffic is low over one of the telephone channels of the fixed station to a maintenance center. A method of this kind is restricted to off-line processing of maintenance information transmitted by the fixed station. In the conventional way this maintenance information is transmitted daily. The maintenance center does not have an accurate overview of the status of a set of fixed stations, and this results in constraints and limitations when it comes to processing the maintenance information, in particular with regard to the time taken to return faulty fixed stations to service. Also, each center has data on only the fixed stations for which it is directly responsible.

One object of the invention is to propose a maintenance method enabling the operating personnel of a set of fixed stations to have an overview of the status of those fixed stations updated in real time as a result of immediate transmission to a central point of messages reporting incidents and enabling the operating personnel to start a self-test procedure in a fixed station at any time and to receive immediately a message indicating the results of said self-tests.

Another object of the invention is to enable the operating personnel to download modified fixed station software to enhance the fixed station functions or to remove a faulty fixed station partly or completely from service. The method must then provide means of identifying the version of the software in use in a given fixed station.

A further object of the invention is to enable centralization at a maintenance center of maintenance information on a number of sets of fixed stations for which respective operators are individually responsible, so enabling regional operating personnel to consult data concerning their respective sets of fixed stations through remote terminals.

To achieve these objects the method in accordance with the invention is implemented in a wireless telephone network which has an intelligent network structure.

SUMMARY OF THE INVENTION

The invention consists in a centralized maintenance method for a wireless telephone network comprising:
- a distribution network comprising fixed stations and wireless digital telephones linked by radio to the fixed stations;
- an integrated services digital public switched telephone network to which each fixed station is connected by a user to user signaling channel;
- service control points connected to said public switched telephone network and each comprising a wireless telephone service subscriber database and a call processing device; and
- service management system comprising a reference database;

which method consists in:
- transmitting a maintenance message from a fixed station to a service control point over the user to user signaling channel in response to the fixed station detecting a fault;
- generating a maintenance ticket at said service control point; and
- transmitting said maintenance ticket to said service control point and storing it in said database.

The above method makes maintenance information concerning incidents detected by the fixed stations available without delay because the information is transmitted over the user to user signaling channel, parallel with and independently of telephone signals, and then stored in real time in the service management system database.

A preferred method in accordance with the invention further consists in:
- transmitting a self-test instruction from said service management system to a fixed station via a service control point serving said station over the user to user signaling channel;
- executing a self-test procedure in the fixed station receiving said instruction;
- transmitting a maintenance message containing the test results from said fixed station to said service management system over said user to user signaling channel;
- generating a maintenance ticket from said maintenance message in said service control point and transmitting it to said service management system; and
- storing said maintenance ticket in said database of said service management system.

This method enables a self-test procedure to be started periodically in each fixed station in turn, the period being a parameter that can be assigned a value by the fixed station operator. It also enables the procedure to be executed on a "one off" basis in any specific fixed station, at any time, by the fixed station operator, for example to verify that a fixed station that has just been repaired is operating correctly. In all cases the test results are immediately available in the service management system database.

In a preferred method in accordance with the invention that can be used in a network in which the fixed station software is at least in part replaceable, to modify the software of a fixed station at the initiative of the fixed station operator the method further consists in: transmitting information from said service management system via the service control point serving said station over a telephone channel connecting said station to said public switched telephone network, and, to enable an operator to determine the status of the software of a fixed station, transmitting a word identifying the software version of a fixed station in each maintenance message sent by said fixed station to said service management system.

This method makes provision for maintaining the software in each fixed station and enables the software version in a fixed station to be determined when the station sends a maintenance message. This facility to modify the software of a fixed station provides in particular for taking all or part of a fixed station out of service under remote control.

A preferred method in accordance with the invention further consists in:

transmitting from said service management system to a terminal of a regional maintenance center maintenance information concerning the set of fixed stations of a region, said information being read from the database of the service management system; and transmitting from the service management system to a terminal of a national maintenance center maintenance information concerning the set of fixed stations of a set of regions, said information being read from said database of said service management system.

This method enables different operators to manage the maintenance of several different sets of fixed stations, covering separate regions, for example, and a national center to manage the maintenance of all the sets of fixed stations taken together.

The invention will be better understood and further details of the invention will emerge from the following description given by way of non-limiting example only and the accompanying diagrammatic drawings.

DETAILED DESCRIPTION OF THE INVENTION

Figure 1:
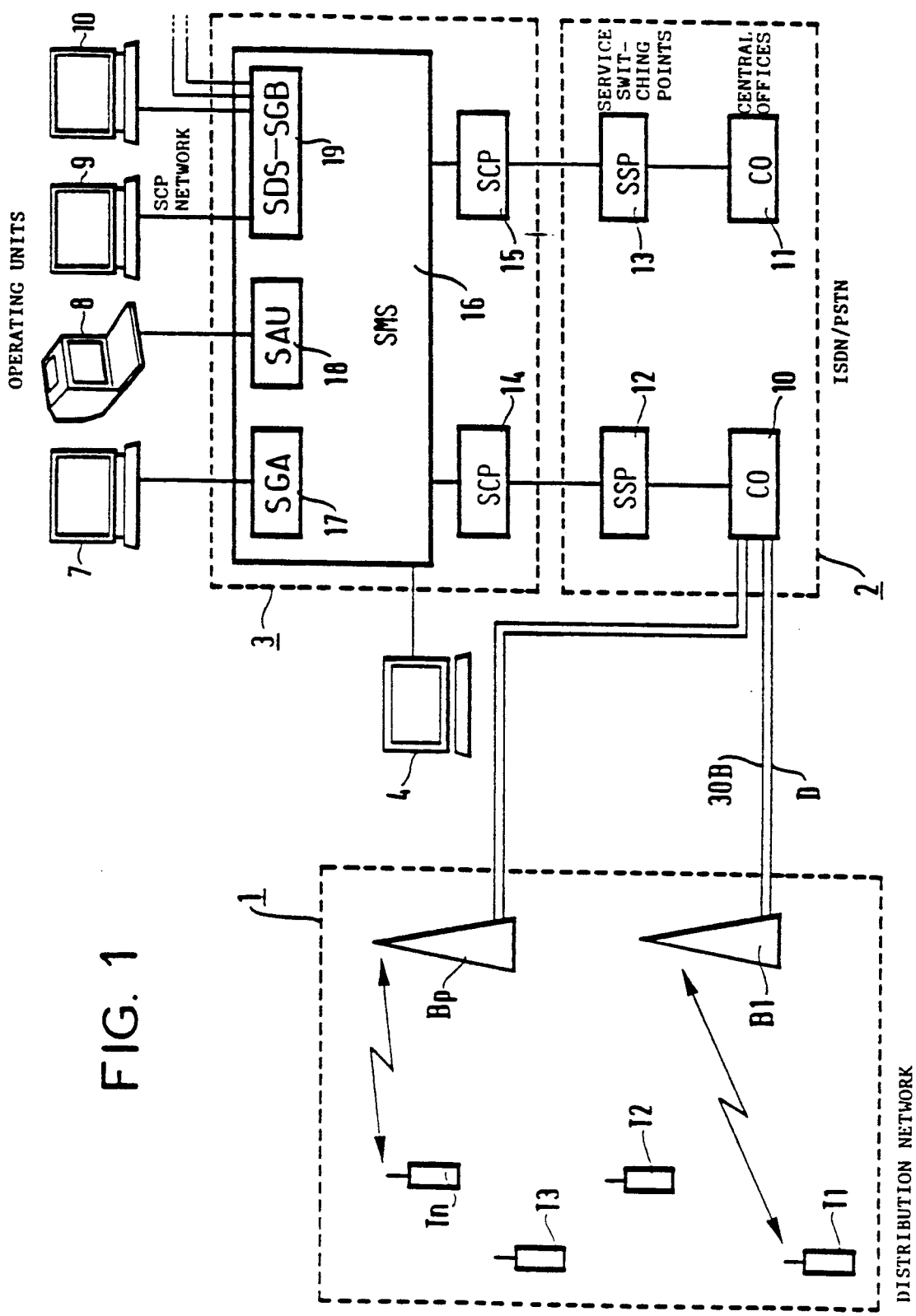
FIG. 1 shows one example of an intelligent network structure wireless telephone network implementing the method in accordance with the invention.

FIG. 1 is a block diagram of one example of an intelligent wireless telephone network in which a method in accordance with the invention is implemented. It comprises: a distribution network 1; an integrated services digital public switched telephone network 2; a service control point network 3; and administration units 4, 7, 8 and 9.

The distribution network 1 comprises portable wireless digital telephones T1 through Tn and fixed stations B1 through Bp. Each telephone can be linked by radio to a nearby fixed station. Each fixed station B1 through Bp can service several (say 40) telephones at the same time and is connected by standard ports to the public switched telephone network 2. In this example each mobile telephone is required to remain in the vicinity of the same fixed station throughout the duration of a call but the invention is equally applicable to a network enabling call handover from one fixed station to another adjacent fixed station to enable the mobile telephone to move around during a call. Each standardized port to the network 2 provides a user to user signaling channel D and a number of telephone channels B. The number of telephone channels can be 30, denoted 30B. These bidirectional telephone channels are switched in circuit mode. The bidirectional user to user signaling channel is switched in message mode. It is used to transmit data in parallel with telephony. A conventional application of this kind is to transmit the telephone number or the caller's name to a display on the called person's telephone terminal.

The public switched telephone network 2 is made up of central offices (CO) and mobile services switching centers (SSP). In this example the network comprises two central offices 10 and 11 connected to respective mobile service switching centers 12 and 13 by CCITT No 7 signaling links. The fixed stations B1 through Bp are connected to the central office 10.

In this example the service control point network 3 comprises two service control points (SCP) 14 and 15 and a service management system (SMS) 16. The network service control points 14 and 15 are connected to the respective mobile services switching centers 12 and 13 by CCITT No 7 signaling links and to the services management system 16 by CCITT X.25 links. The operating units 7 through 10 etc are connected to the SMS 16 by X.25 links via a data switching network (not shown).

Each operating unit 4, 7, 9 and 10 essentially comprises a screen-keyboard terminal. The terminals are assigned to different administration teams, the service management system 16 providing information and dialogue resources for each team. The terminal 4 is assigned to the intelligent network technical operator. Each terminal 9, 10, etc is assigned to a technical operator of the set of fixed stations or of a particular subset of fixed stations. Each accesses the database of the service management system 16 via a fixed station management server (SGB) and a statistics server (SDS) combined in a single unit 19. The optional terminal 8 is a videotex (Minitel) terminal enabling a subscriber to consult service data: subscription data and fast billing tickets. It accesses the service management system 16 via a user access server (SAU) 18. The terminal 7 is a videotex terminal assigned to the wireless telephone service sales operator. It accesses the service management system 16 via a subscriber management server (STA) 17.

Each fixed station B1 through Bp includes a controller which supervises B telephone channel interfaces, D signaling channel interfaces and radio channel interfaces. This controller has the following functions:

initialization of a call to the network when a radio channel is seized by a telephone T1 through Tn;

contributing to the caller authentication procedure;
analyzing information received on the radio channels;
supervising the radio channels;
carrying out an internal self-test procedure in connection with fixed station maintenance;
downloading modifications to the fixed station software;
measurements (counts and statistics);
radio channel synchronization.

A call for service from a public network 2 user is analyzed in the mobile service switching center 12 or 13 and then passed to the respective service control point 14 or 15. The service control point then controls call processing and the mobile service switching center in respect of all actions requiring switching resources: for example: to send a recorded announcement, or to set up a connection between a network input and a network output, or to introduce a time-delay. Service control point software for each service organized as a string of basic actions processes each call on the basis of messages received. It also has access to a database updated in real time.

The service management system 16 is not involved in call processing. However, it contains in a database the service software and the subscriber data and therefore constitutes a reference source for the service. It handles technical administration of the network of service control points 14 and 15, in particular to maintain database consistency; it also handles commercial administration of the service: contract management, operator access, subscriber access.

The service control points 14 and 15 and the service management system 16 may be in the form of an ALCATEL8300 multiprocessor marketed by the ALCATEL company, for example.

Figure 2:
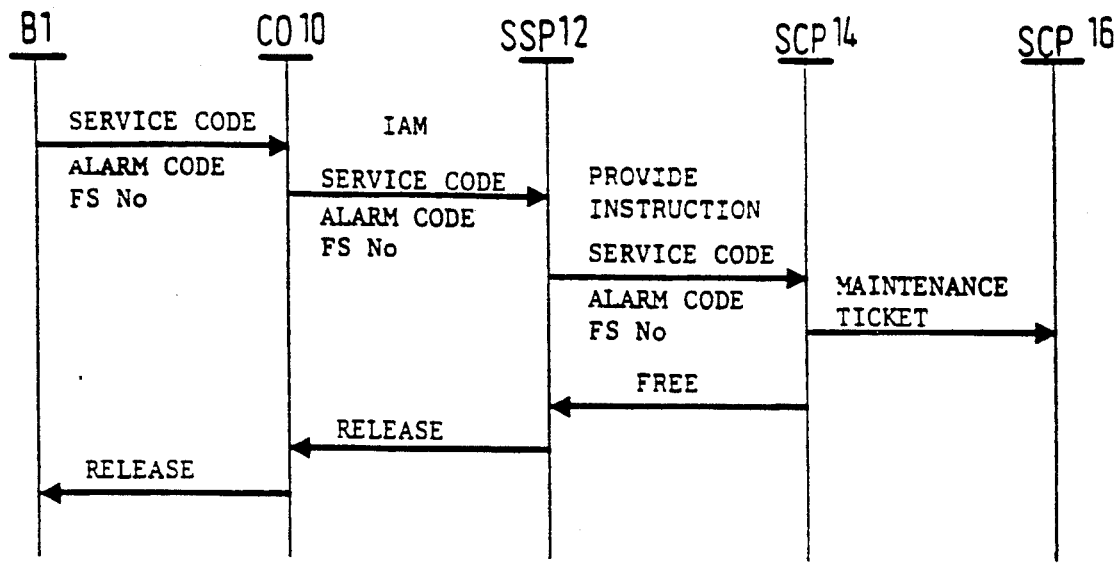
FIG. 2 is a timing diagram showing the transmission of a maintenance message by a fixed station which has detected an incident.

FIG. 2 is a timing diagram showing the control messages exchanged to transmit a maintenance message output spontaneously by the fixed station B1 when it detects an incident. The time axis runs from the top to the bottom of the figure. The fixed station B1 sends the maintenance message to the central office 10 over the user to user signaling channel D. The message includes a service code, a number designating the fixed station and a code designating the nature of the alarm.

The alarm may be due to a radio segment failure, for example. The radio segment is tested by looping the radio channels periodically at the initiative of the controller in the fixed station. The period is a downloadable parameter. Its value may be equal to one hour, for example. The alarm may equally concern a failure of the network segment which is decentralized in the fixed station and which consists of the controller and the network interfaces. Self-tests on this controller can show up faults including: an incorrect memory checksum; an inaccessible LAP D protocol controller; etc. The fixed station can also detect incidents concerning telephone calls.

It also sends a maintenance message when it detects that a fault has cleared.

When a fixed station sends a spontaneous maintenance message the message is routed to a predetermined service control point 14 or 15 serving the fixed station for maintenance purposes. This is determined by the service code included in each maintenance message. The central office 10 sends a message to the mobile service switching center 12. This message IAM contains the maintenance message in a user to user signaling field. The mobile service switching center 12 sends another message to the service control point 14. This message PROVIDE INSTRUCTION contains the maintenance message in a user to user signaling field.

The service control point 14 acknowledges this message by sending a message FREE to the mobile services switching center 12 and then generates a maintenance ticket containing:
the fixed station number, type and characteristics;
the number of the network port wo which the fixed station is connected;
a code designating the nature of the alarm;
the fixed station software version; and
the date and time of the incident.

The mobile services switching center 12 sends to the central office 10 a message RELEASE which is then forwarded to the fixed station B1 and which causes the link to be released. This message is conveyed by the user to user signaling channel.

The maintenance ticket is transmitted from the service control point 14 to the service management system 16 where it is written into a part of the database dedicated to fixed station maintenance data.

Figure 3:
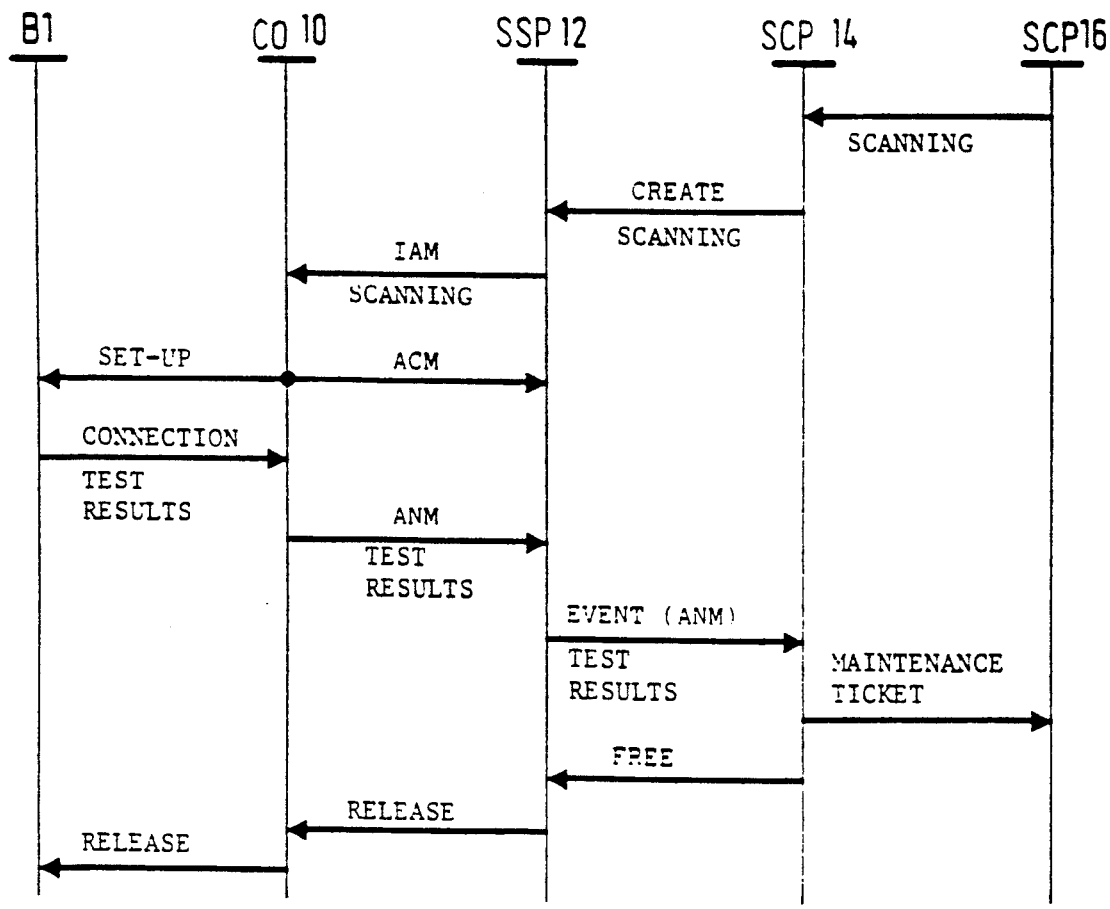
FIG. 3 is a timing diagram showing the transmission of a self-test instruction to a fixed station and the transmission by this fixed station of a maintenance message including the results of this test.

FIG. 3 is a timing diagram showing the control messages exchanged for the service management system 16 to interrogate the status of the fixed station B1 at the initiative of the fixed station operator or at the initiative of periodic interrogation software. The service management system 16 sends a message SCANNING to the service control point 14 which retransmits it in a message CREATE, in a field reserved for user to user signaling, to the mobile service switching center 12. The latter retransmits the instruction in a message IAM, in a field reserved for user to user signaling, to the central office 10. The latter sets up a link to the fixed station B1 and transmits the instruction to it. The instruction is transmitted over the user to user signaling D channel. The central office 10 also sends a receive acknowledge message ACM to the mobile services switching center 12.

On receiving the self-test instruction the fixed station B1 executes the self-test procedure which relates to the general technical status of the station and the telephone channels connecting to the network. This procedure also entails retrieving the characteristics of the station, including a software version indicator. The station B1 sends the test results in a message CONNECTION, over the user to user signaling D channel to the central office 10. The latter retransmits the test results to the mobile services switching center 12, in a message ANM, in a field reserved for user to user signaling.

The mobile services switching center 12 retransmits the test results to the service control point 14 in a message EVENT (ANM), in a field reserved for user to user signaling. The service control point 14 generates a maintenance ticket and sends a message FREE to the mobile services switching center 12 which causes the link with the station B1 to be released. This instruction is forwarded from the mobile services switching center 12 to the central office 10, in a RELEASE message. This message is forwarded from the central office 10 to the station B1.

The maintenance ticket is similar to that generated in the case of a spontaneous call from the station B1. It is stored in the part of the database of the service management system 16 reserved for fixed station maintenance data. The data from each ticket is compared with reference data stored in a database file in order to detect any problems.

Centralized maintenance of fixed stations provides immediate access to up to date and consistent data for the whole of a set of fixed stations. It also offers great flexibility in organizing the maintenance of fixed stations by different operators. It enables sets of fixed stations and corresponding maintenance centers to be defined dynamically and independently of the actual geographical distribution of the fixed stations.

Maintenance information can be used at two levels: in regional centers covering a limited set of fixed stations and in a national center covering all sets of wireless telephone service fixed stations. In the FIG. 1 example, a technical operating unit 9 could be a national maintenance center from which an operator supervises all sets of fixed stations while the technical operating centers 10, etc might be regional maintenance centers each supervising a separate set of fixed stations.

The software of each fixed station can be downloaded from a technical operating unit 9, 10, etc via the service control point for the fixed station in question. Partial downloading is carried out if fixed station maintenance requires only changing of operating parameters such as a time-delay or the removal from service of one or more channels of a faulty fixed station, for example a fixed station accidentally initiating calls. A complete download is carried out when the station is first placed in service, or if its capacity is increased by adding radio modules and modifying interfaces, or when a new version of the software is shipped. Downloading may also be needed in the exceptional case of loss of station controller memory following a power supply failure.

To provide a bit rate greater than that of the user to user signaling D channel, downloading can use one of the 30 B telephone channels connecting the fixed station to the network, each of which has a bit rate of 64 kbit/s. The implementation of a downloadable software kernel resident in the controller of each fixed station will be obvious to those skilled in the art.

Each regional maintenance center 10, etc manages a set of fixed stations defined on the basis of geographical, functional or legal criteria. Each regional center has access only to data concerning its set of fixed stations. A regional operator has access to the fixed station database through the fixed station management server 19 and can:
create, delete, modify and list fixed stations;
issue self-test instructions;
place various fixed station channels in service or take them out of service;
download modified fixed station software or operating data;
consult fixed station logs recording the onset and clearing and faults.

A regional operator has access to statistical data through the statistics server 19, which can generate statistics on traffic or on faults and can consult: the operator logs; the call logs reporting call faults; and the daily administration balances.

The national operator has access to statistical data covering all the regional maintenance centers 10, etc which it uses to establish balances for all fixed stations, for a given type of fixed station, for a geographical entity, etc.

For some types of fault requiring immediate action the service management system 16 causes an alarm message to be sent to an ASCII terminal of the maintenance center concerned. An alternative approach might be to send an alarm signal to an operator telephone using a recorded or synthesized spoken message. The called operator could then set up a session at an ASCII terminal to consult the data relating to the fault.

As an alternative to this, the service management system 16 might set up an X.25 protocol link and send a message to a dedicated intelligent terminal such as a personal computer of the operator concerned. The message would be processed by dedicated software of the intelligent terminal, in particular to activate an alarm.

Maintenance of the public switched telephone network port of each fixed station is independent of maintenance of the fixed station itself. It uses a conventional process of testing an integrated services digital network port. The test results are stored in a public network technical operator database but can be consulted by a wireless telephone service operator if the public network has a telecommunications management network structure which includes interfaces enabling different operators to access the database.

There is claimed:

1. Centralized maintenance method for a wireless telephone network including a distribution network having fixed stations and wireless digital telephones linked by radio to the fixed stations, an integrated services digital public telephone network to which each of the fixed stations is connected by one or more circuit switched telephone channels and a message mode switched user-to-user signaling channel, service control points connected to said public switching telephone network and each containing a wireless telephone service subscriber database and a call processing device, and a service management system comprising a reference database, said method comprising the steps:

downloading software having an associated software version at the initiative of an operator of one of said fixed stations from said service management system via said one service control point over one of said circuit switched telephone channels, detecting a fault at said one fixed station;

using the user-to-user signaling channel to transmit a maintenance message including a word identifying said associated software version from the fixed station to an associated one of the service control points as soon as the fault has thus been detected by the fixed station, in parallel with and independently of any telephone signals being transmitted over said circuit-switched telephone channels;

generating a maintenance ticket at said service control point as soon as the maintenance message has thus been transmitted over the user-to-user channel; and transmitting the thus generated maintenance ticket to said service management system and storing it in said reference database.

2. Centralized maintenance method for a wireless telephone network including a distribution network having fixed stations and wireless digital telephones linked by radio to the fixed stations, an integrated services digital public telephone network to which each of the fixed stations is connected by one or more circuit switched telephone channels and a message mode switched user-to-user signaling channel, service control points connected to said public switching telephone network and each containing a wireless telephone service subscriber database and a call processing device, and a service management system comprising a reference database, said method comprising the steps:

detecting a fault at one of the fixed stations;

using the user-to-user signaling channel to transmit a maintenance message from said one fixed station to an associated one of the service control points as soon as the fault has thus been detected by the fixed station, in parallel with and independently of any telephone signals being transmitted over said circuit-switched telephone channels;

generating a maintenance ticket at said service control point as soon as the maintenance message has thus been transmitted over the user-to-user channel;

transmitting the thus generated maintenance ticket to said service management system and storing it in said reference database;

reading maintenance information concerning a regional set of fixed stations from the reference database of the service management system;

transmitting said maintenance information concerning the regional set of fixed stations of a single region from said service management system to a terminal of a regional maintenance center; and transmitting from the service management system to a terminal of a national maintenance center maintenance information in said reference database concerning a super-regional set of fixed stations of a plurality of regions.

3. A wireless telephone network comprising:

a plurality of fixed stations each including software that is at least in part replaceable at the initiative of an operator of said each station;

a plurality of wireless digital telephones;

means for linking the wireless digital telephones by radio to the fixed stations;

an integrated services digital public telephone network having a plurality of circuit switched telephone channels and at least one message switched user-to-user signaling channel for connecting the fixed stations to the public telephone network;

a plurality of service control points connected to said public switching telephone network and each comprising a wireless telephone service subscriber database and a call processing device;

a service management system comprising a reference database;

means for transmitting a maintenance message from a fixed station to a service control point over the user-to-user signaling channel in response to the fixed station detecting a fault, independent of any telephone signals then being transmitted between the fixed station and the service control point over said circuit-switched telephone channels;

means for generating a maintenance ticket at said service control point;

means for transmitting said maintenance ticket to said service management system and storing it in said reference database;

means for downloading replacement software having an associated software version from said service management system to a designated fixed station via the service control point serving said designated fixed station over a telephone channel connecting said designated fixed station to said public switching telephone network, and means for transmitting a word identifying said software version of a fixed station in each respective maintenance message sent by said designated fixed station to said service management system.

4. A wireless telephone network comprising:

a plurality of fixed stations;

a plurality of wireless digital telephones;

means for linking the wireless digital telephones by radio to the fixed stations;

an integrated services digital public telephone network having a plurality of circuit switched telephone channels and at least one message switched user-to-user signaling channel for connecting the fixed stations to the public telephone network;

a plurality of service control points connected to said public switching telephone network and each comprising a wireless telephone service subscriber database and a call processing device;

a service management system comprising a reference database;

means for transmitting a maintenance message from a fixed station to a service control point over the user-to-user signaling channel in response to the fixed station detecting a fault, independent of any telephone signals then being transmitted between the fixed station and the service control point over said circuit-switched telephone channels;

means for generating a maintenance ticket at said service control plant;

means for transmitting said maintenance ticket to said service management system and storing it in said reference database;

means for transmitting from said service management system to a terminal of a regional maintenance center, maintenance information concerning a regional set of fixed stations of a region, said information being read from the reference database of the service management system;

means for reading from said service management system maintenance information concerning a super-regional set of fixed stations of a plurality of regions, said information being read from said reference database of said service management system; and means for transmitting said maintenance information concerning said super-regional set of fixed stations to a terminal of a super-regional maintenance center.

* * * * *